(12) United States Patent
Medwell

(10) Patent No.: US 8,454,082 B2
(45) Date of Patent: Jun. 4, 2013

(54) VEHICLE

(75) Inventor: Roger Terence Arthur Medwell, Coventry (GB)

(73) Assignee: NP Aerospace Limited, Coventry (GB)

( * ) Notice: Subject to any disclaimer, the term of this patent is extended or adjusted under 35 U.S.C. 154(b) by 0 days.

(21) Appl. No.: 13/096,483

(22) Filed: Apr. 28, 2011

(65) Prior Publication Data

US 2011/0272968 A1 Nov. 10, 2011

(30) Foreign Application Priority Data

May 10, 2010 (GB) .................................. 1007512.5

(51) Int. Cl.
*B62D 39/00* (2006.01)
*B62D 23/00* (2006.01)
*F41H 5/04* (2006.01)
*F41H 5/06* (2006.01)

(52) U.S. Cl.
USPC ..................... 296/193.03; 89/36.02; 89/36.08

(58) Field of Classification Search
USPC ............... 296/136.1, 136.01, 136.02, 136.06, 296/136.07, 181.1, 187.03, 187.07, 193.03, 296/187.08; 150/167, 168, 166; 293/128
See application file for complete search history.

(56) References Cited

U.S. PATENT DOCUMENTS

| | | | | |
|---|---|---|---|---|
| 4,186,648 A * | 2/1980 | Clausen et al. | ............. | 89/36.02 |
| 4,404,889 A * | 9/1983 | Miguel | ......................... | 89/36.02 |
| 5,533,781 A * | 7/1996 | Williams | ...................... | 296/204 |
| 5,663,520 A * | 9/1997 | Ladika et al. | ............. | 296/187.07 |
| 5,800,006 A * | 9/1998 | Pettigrew | ................. | 296/136.02 |
| 5,984,401 A * | 11/1999 | Hannah | .................... | 296/136.01 |
| 7,100,965 B1 * | 9/2006 | Stover | ...................... | 296/136.07 |
| 7,114,764 B1 * | 10/2006 | Barsoum et al. | ......... | 296/193.07 |
| 7,331,270 B2 * | 2/2008 | Booher | ........................ | 89/36.02 |

* cited by examiner

*Primary Examiner* — Glenn Dayoan
*Assistant Examiner* — Sunsurraye Westbrook
(74) *Attorney, Agent, or Firm* — Clement A. Berard, Esq.; Dan, Dorfman, Herrell & Skillman, PC

(57) ABSTRACT

A protective vehicle body of non-metallic material comprises an integrally molded base (1) providing a floor and a lower body wall (5), the lower body wall having a lip (6) extending outwardly therefrom; and an upper part (2) providing a roof and an upper body wall, a lower edge of the upper body wall fitting within the lip (6) and being demountably attached to the base (1). The body forms part of a vehicle additionally having a front portion (8) including a front axle and a rear portion (9) including a rear axle, the front and rear portions (8, 9) being attached to the vehicle body by attachment means that are severable from the vehicle body by a blast wave.

17 Claims, 3 Drawing Sheets

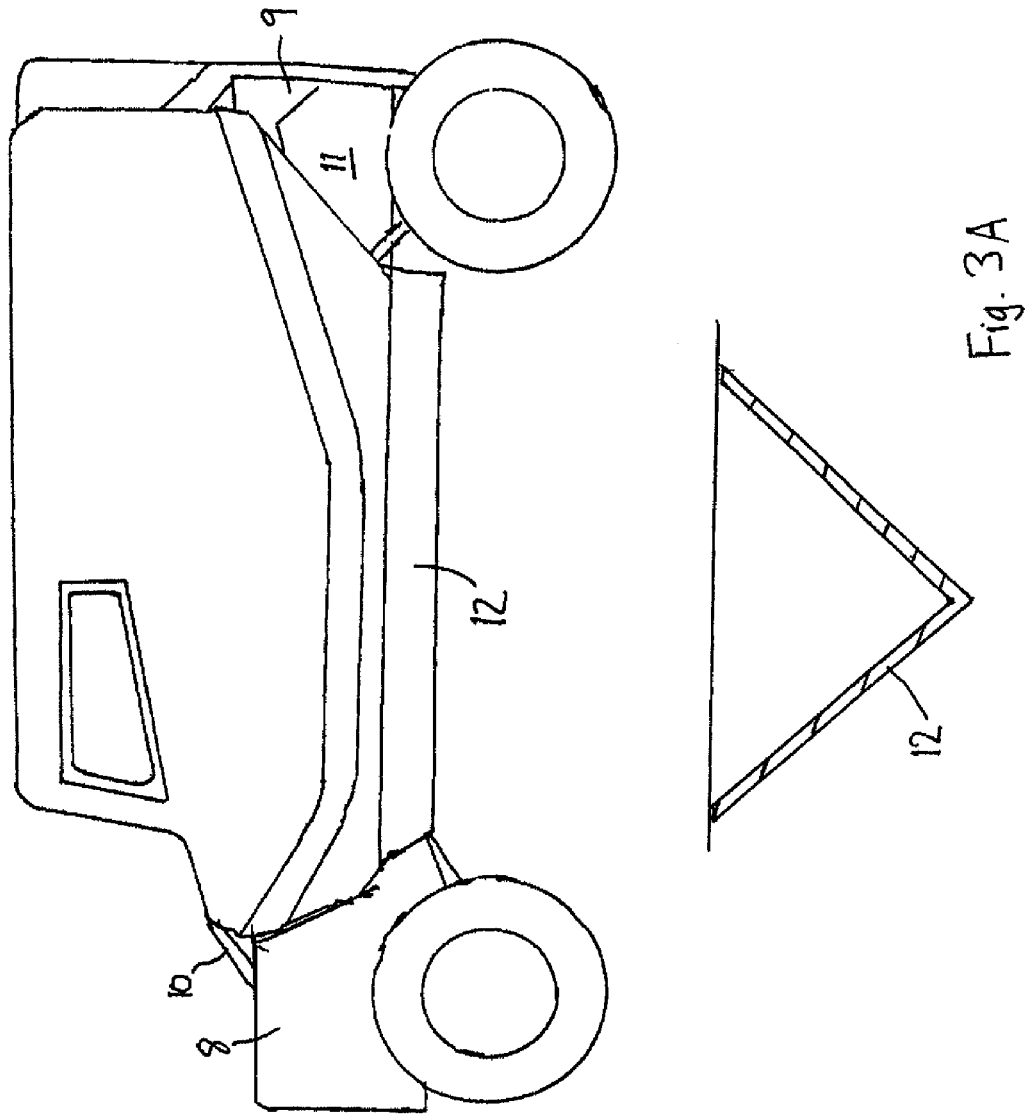

VEHICLE

This Application claims the benefit of United Kingdom Patent Application Number 1007512.5 filed 5 May 2010 in the name of NP Aerospace Limited and entitled "VEHICLE," which is hereby incorporated herein by reference in its entirety.

This invention relates to a blast-protective vehicle body and a blast-protective vehicle.

BACKGROUND TO THE INVENTION

Known armored vehicles generally include an all-welded metallic body capable of withstanding certain impacts and blasts. In the event of failure of such a body either parts of the bodywork or other metallic components of the vehicle can injure the occupants. In addition, such failure often involves irreparable damage to the vehicle.

SUMMARY OF THE INVENTION

The present invention seeks to provide a vehicle affording increased protection for occupants, for example against land mines.

From one aspect, the invention provides a protective vehicle body of non-metallic material, the body comprising a molded base providing a floor and a lower body wall, the lower body wall having a lip extending outwardly therefrom; and an upper part providing a roof and an upper body wall, a lower edge of the upper body wall fitting within the lip and being demountably attached to the base. The attachment may be by means of bolts.

In one embodiment, the base and/or the upper part are formed from glass fiber, but they may alternatively be formed from carbon fiber or other composite materials.

The upper part may be a single molding or may, for convenience, be formed from two or more molded pieces, which may be demountably attached together, for example by means of bolts.

From another aspect, the invention provides a vehicle comprising: a vehicle body of non-metallic material, optionally as defined above; a front portion including a front axle and a rear portion including a rear axle, the front and rear portions being attached to the vehicle body by attachment means that are severable from the vehicle body by a blast wave.

The attachment means may comprise bolts or other fasteners attached to the vehicle body or to one or more non-metallic members attached to the body. Brackets may connect the bolts to the front and/or rear portions.

In an embodiment of the vehicle, the front portion houses an engine; it may also house a gearbox. A V-shaped blast deflecting plate may be arranged below the vehicle body. A distributor shaft may extend between this plate and the vehicle body.

In a particular embodiment, the center of gravity, or even 80% or 100% of the mass of the front portion, is disposed forward (i.e. not below) any part of the vehicle body. Similarly the center of gravity, or even 60% or 100% of the mass of the rear portion is disposed rearward (i.e. not below) any part of the vehicle body.

BRIEF DESCRIPTION OF THE DRAWING

The detailed description of the preferred embodiment(s), by way of example only, will be more easily and better understood when read in conjunction with the FIGURES of the Drawing which include:

FIG. 3 is a schematic side view of a partially constructed vehicle according to an example embodiment of the invention, and FIG. 3A is a cross-sectional view of the blast deflecting plate thereof.

Figure 1:
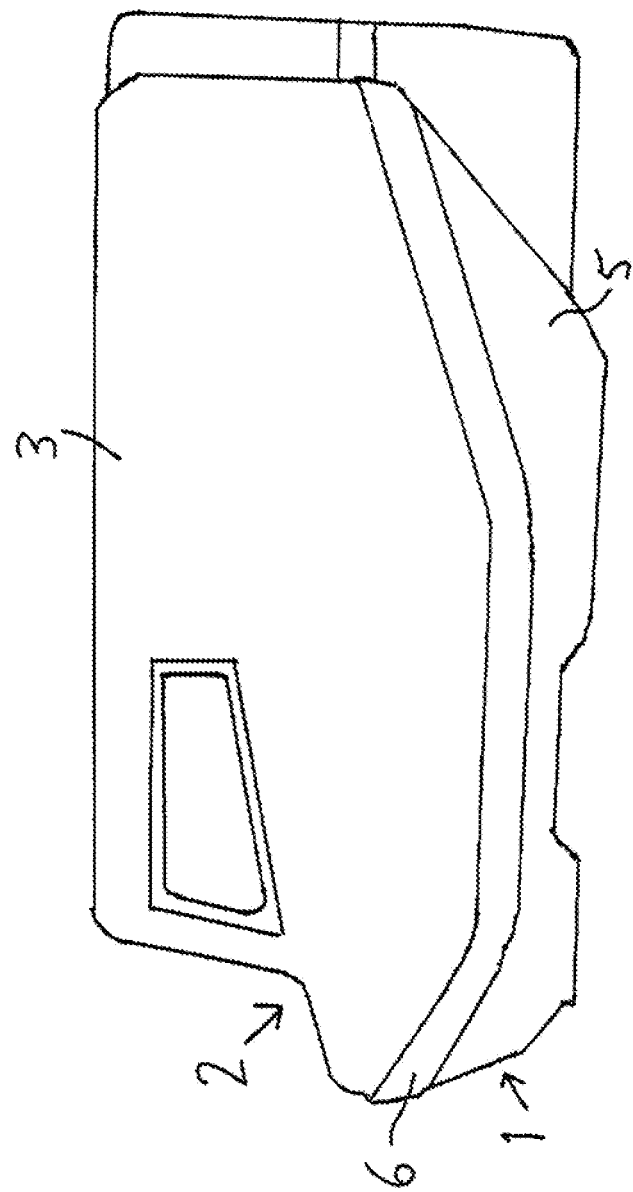
FIG. 1 is a side view of a vehicle body according to an example embodiment of the invention.

In the Drawing, where an element or feature is shown in more than one drawing figure, the same alphanumeric designation may be used to designate such element or feature in each figure. According to common practice, the various features of the drawing are not to scale, and the dimensions of the various features may be arbitrarily expanded or reduced for clarity, and any value stated in any Figure is given by way of example only.

DESCRIPTION OF A PARTICULAR PREFERRED EMBODIMENTS

Figure 2:
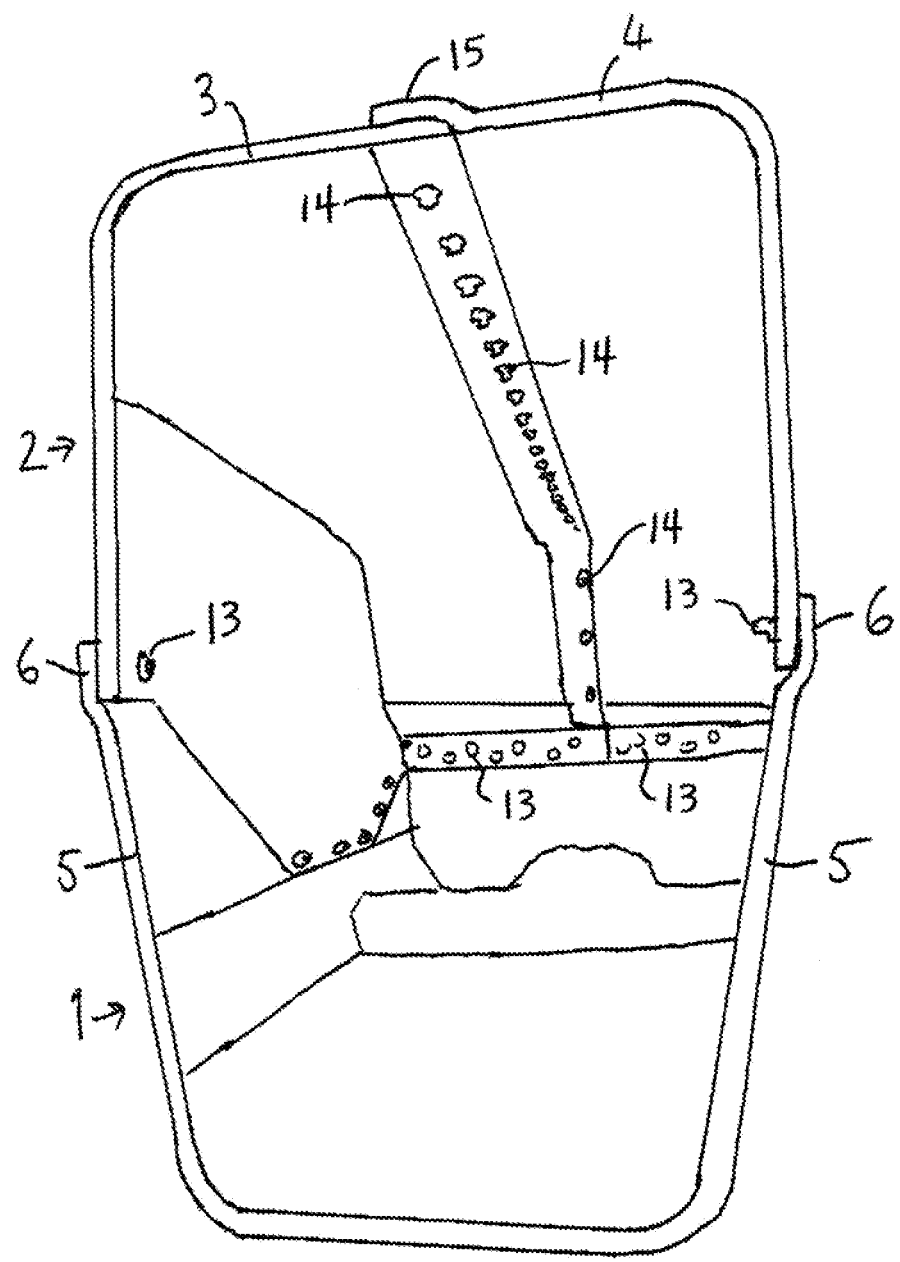
FIG. 2 is a rear view of the example vehicle body of FIG. 1.

FIGS. 1 and 2 show a monocoque vehicle body comprising a base 1 and an upper part 2. The base 1 is formed from a single molding, in this example of S-2 Glass® material supplied by AGY of Aiken, S.C., USA. As shown, the upper part 2 is formed from a left half 3 and a right half 4, each being a single molding of S-2 Glass, but could alternatively comprise a single molding.

The base 1 has wall parts 5 formed at their upper edge with a lip 6. The upper part 2 fits within the lip 6 and is bolted 13 thereto. A similar bolted joint 15 is formed between the left and right halves 3, 4. The bolted joint 15 may be an overlap joint 15 having a plurality of fasteners 14 along the joint 15.

As the upper part 2 fits within the lip 6 of the base 1, a blast wave impacting the underside of the vehicle is borne by the entire vehicle body. There is no separate part of the base 1 that can be forced inwards and injure the occupants.

FIG. 3 shows the vehicle body with attached front portion 8 and rear portion 9, and FIG. 3A shows a cross-sectional view of the blast deflecting plate 12 thereof. The front portion 8 contains the engine and gearbox and the front axle and is bolted via struts 10 to the vehicle body, e.g., by blast severable fasteners.

The rear portion 9 houses the rear axle and is attached to oblique flanges 11 which in turn are attached to the vehicle body, e.g., by blast severable fasteners.

In the event of a severe blast emanating from a road surface the front and rear portions 8, 9 can shear off the vehicle body, which remains intact with no ingress of metal or other parts that could injure the occupants.

A V-shaped blast deflecting plate 12 is arranged below the vehicle body, e.g., generally rearward of the front portion 8 and forward of the rear portion 9.

The vehicle of the invention does not require spall armor as there is no metal in the structure. The significant reduction in the number of parts allows a substantial reduction in weight. Also, unlike a steel structure, the composite structure of the vehicle of the invention attenuates a blast effect.

A protective vehicle body 1, 2 of non-metallic material, the body 1, 2 may comprise an integrally molded base 1 providing a floor and a lower body wall 5, the lower body wall 5 having a lip 6 extending outwardly therefrom; and an upper part 2 providing a roof and an upper body wall, a lower edge of the upper body wall fitting within the lip 6 and being demountably attached to the base 1. The upper body wall 2 may be attached to the base 1 by means of bolts 13. Base 1 may be formed from glass fiber. Upper part 2 may be formed from glass fiber, and may be a single molding.

A vehicle 1, 2, 8, 9 may comprise: a vehicle body 1, 2 of non-metallic material, a front portion 8 including a front axle and a rear portion 9 including a rear axle, the front and rear portions 8, 9 being attached to the vehicle body 1, 2 by fasteners that are severable from the vehicle body 1, 2 by a blast wave. The vehicle body 1, 2 may be of non-metallic material, and may comprise an integrally molded base 1 providing a floor and a lower body wall 5, the lower body wall 5 having a lip 6 extending outwardly therefrom; and an upper part 2 providing a roof and an upper body wall, a lower edge of the upper body wall fitting within the lip and being demountably attached to the base 1. The fasteners may comprise bolts attached to the vehicle body 1, 2, and/or may comprise bolts attached to one or more non-metallic members attached to the body 1, 2. The vehicle may include brackets 10, 11 connecting the fasteners to the front and/or rear portions 8, 9. The vehicle may include a V-shaped blast deflecting plate 12 arranged below the vehicle body 1, 2.

A vehicle 1, 2 may comprise: a non-metallic vehicle body 1, 2 comprising a base 1 and an upper body 2, the base 1 of the vehicle body may include a non-metallic integrally molded base 1 defining a floor and a lower body wall 5 extending from the floor and defining an upper edge of the lower body wall 5, wherein the upper edge of the lower body wall 5 defines an outwardly extending lip 6, the upper body 2 of the vehicle body including a non-metallic upper body 2 defining a roof and an upper body wall extending therefrom and defining a lower edge, wherein the lower edge of the upper body 2 is formed to fit within and adjacent to the lip 6 of the lower body wall 5 of the base 1, and a plurality of fasteners 13 attaching the lower edge of the upper body 2 along and within the lip 6 at the upper edge of the lower body wall 5, wherein the base 1 and the upper body 2 together form a non-metallic monocoque vehicle body. The vehicle may further comprise a V-shaped blast deflecting plate 12 arranged below the non-metallic vehicle body 1, 2. The vehicle may further comprise: a vehicle front portion 8 including a front axle, a vehicle rear portion 9 including a rear axle, and a first plurality of blast severable fasteners attaching the vehicle front portion 8 to a front portion of the base 1 of the non-metallic vehicle body, and a second plurality of blast severable fasteners attaching the vehicle rear portion 9 to a rear portion of the base 1 of the non-metallic vehicle body, and may further comprise a V-shaped blast deflecting plate 12 arranged below the non-metallic vehicle body rearward of the vehicle front portion 8 and forward of the vehicle rear portion 9. The base 1 of the non-metallic vehicle body may be formed of a single molding. The upper body 2 of the non-metallic vehicle body may include: at least first and second molded pieces 3, 4 that overlap at a joint 15 therebetween, and a plurality of fasteners 14 attaching the at least first and second molded pieces 3, 4 of the upper body 2 along the overlap joint 15 therebetween.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "front," "rear," "side," "top," "bottom," "forward," "backward," "under" and/or "over," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

While the present invention has been described in terms of the foregoing example embodiments, variations within the scope and spirit of the present invention as defined by the claims following will be apparent to those skilled in the art. For example, where a specific fastener is described, e.g., a bolt, the described fastener or any other suitable fastener may be employed.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A protective vehicle body of non-metallic material, the body comprising an integrally molded base providing a floor and a lower body wall, the lower body wall having a lip extending outwardly therefrom; and an upper part providing a roof and an upper body wall, a lower edge of the upper body wall fitting within the lip and being demountably attached to the base.

2. A vehicle body according to claim 1, wherein the upper body wall is attached to the base by means of bolts.

3. A vehicle body according to claim 1, wherein the base is formed from glass fiber.

4. A vehicle body according to claim 1, wherein the upper part is formed from glass fiber.

5. A vehicle body according to claim 1, wherein the upper part is a single molding.

6. A vehicle comprising: a vehicle body of non-metallic material, a front portion including a front axle and a rear portion including a rear axle, the front and rear portions being attached to the vehicle body by fasteners that are severable from the vehicle body by a blast wave.

7. A vehicle according to claim 6, wherein the vehicle body is of non-metallic material, and comprises an integrally molded base providing a floor and a lower body wall, the lower body wall having a lip extending outwardly therefrom; and an upper part providing a roof and an upper body wall, a lower edge of the upper body wall fitting within the lip and being demountably attached to the base.

8. A vehicle according to claim 6, wherein the fasteners comprise bolts attached to the vehicle body.

9. A vehicle according to claim 6, wherein the fasteners comprise bolts attached to one or more non-metallic members attached to the body.

10. A vehicle according to claim 6, including brackets connecting the fasteners to the front and/or rear portions.

11. A vehicle according to claim 6, including a V-shaped blast deflecting plate arranged below the vehicle body.

12. A vehicle comprising:
a non-metallic vehicle body comprising a base and an upper body,
the base of the vehicle body including a non-metallic integrally molded base defining a floor and a lower body wall extending from the floor and defining an upper edge of the lower body wall, wherein the upper edge of the lower body wall defines an outwardly extending lip, the upper body of the vehicle body including a non-metallic upper body defining a roof and an upper body wall extending therefrom and defining a lower edge, wherein the lower edge of the upper body is formed to fit within and adjacent to the lip of the lower body wall of the base, and a plurality of fasteners attaching the lower edge of the upper body along and within the lip at the upper edge of the lower body wall, wherein the base and the upper body together form a non-metallic monocoque vehicle body.

13. A vehicle according to claim 12, further comprising a V-shaped blast deflecting plate arranged below the non-metallic vehicle body.

14. A vehicle according to claim 12, further comprising:
a vehicle front portion including a front axle,
a vehicle rear portion including a rear axle, and
a first plurality of blast severable fasteners attaching the vehicle front portion to a front portion of the base of the non-metallic vehicle body, and a second plurality of blast severable fasteners attaching the vehicle rear portion to a rear portion of the base of the non-metallic vehicle body.

15. A vehicle according to claim 14, further comprising a V-shaped blast deflecting plate arranged below the non-metallic vehicle body rearward of the vehicle front portion and forward of the vehicle rear portion.

16. A vehicle according to claim 12, wherein the base of the non-metallic vehicle body is formed of a single molding.

17. A vehicle according to claim 12, wherein the upper body of the non-metallic vehicle body includes:
at least first and second molded pieces that overlap at a joint therebetween, and
a plurality of fasteners attaching the at least first and second molded pieces of the upper body along the overlap joint therebetween.

\* \* \* \* \*